Feb. 18, 1964  U. A. BRETING ETAL  3,121,342
TRANSMISSION

Filed Jan. 23, 1959  3 Sheets-Sheet 1

INVENTORS
Ulysses A. Breting,
James J. Mooney, Jr.,
Mark E. Fisher,
BY Frank Blair, Jr., &
John P. Cornet

ATTORNEY

United States Patent Office 3,121,342
Patented Feb. 18, 1964

3,121,342
TRANSMISSION
Ulysses A. Breting and James J. Mooney, Jr., Indianapolis, Mark E. Fisher, Carmel, and Frank Blair, Jr., and John P. Cornet, Indianapolis, Ind., assignors to General Motors Corporation, Detroit, Mich., a corporation of Delaware
Filed Jan. 23, 1959, Ser. No. 788,659
39 Claims. (Cl. 74—472)

This invention relates to power plants and more particularly to an engine and a transmission combination and the controls therefor.

The power plant consists of an engine having an engine speed governor employed to control the fuel supply and a multiratio transmission. The engine is connected to the load by a transmission consisting of a torque converter, a forward and reverse gear unit and a three-speed gear unit consisting of a direct drive, an intermediate overdrive and overdrive to provide three ratios in either forward or reverse, in conjunction with the torque multiplication of the torque converter. Hydraulic controls are employed to actuate fluid operated ratio establishing friction devices to engage the various ratios in response to manual selection by an operator. The operator initially selects first, second or third ratio drive and then selects either forward or reverse to engage the drive. The forward and reverse selector valve has a hydraulic reaction or feel to indicate to the operator the degree of engagement during the establishment of forward drive. In a shift from forward to reverse or vice versa, a hydraulic control is effected to reduce the governed speed of the engine. However, in a shift from neutral to either forward or reverse the controls are not effected to reduce engine speed. The forward and reverse engaging pressure is reduced during initial engagement by a regulator valve to provide a smooth shift and the excess fluid is discharged to a cooling and lubricating line. The forward and reverse selector valve also controls the cooling system to provide a large flow of cooling fluid directed to the ratio establishing friction devices.

An object of the invention is to provide in a hydraulically controlled transmission having fluid operated friction devices for establishing ratio drives, a control system having a controlled pressure source, and a cooling fluid source normally connected to cool the ratio engaging devices, a control system for selectively supplying a control pressure to engage each of said friction devices and connecting the cooling system to the friction device being engaged and a pressure control system reducing the control pressure while the friction device is being engaged and connecting the excess fluid to the friction device being engaged for cooling.

Another object of the invention is to provide in a hydraulically controlled transmission, an improved cooling system having a continuous supply of fluid directed to all ratio establishing friction devices for cooling and an auxiliary supply directed to each ratio establishing device during engagement, both, from the cooling fluid supply system and the control fluid supply system.

Another object of the invention is to provide in a hydraulically controlled transmission, a pressure regulating valve to reduce the pressure when the engagement of a ratio engaging device is initiated, to gradually increase the pressure during engagement and to change the minimum regulated pressure in accordance with a function of transmission operation.

Another object of the invention is to provide in a power plant including an engine and a transmission in which said engine has a constant speed governor controlling the fuel supply and the transmission has a ratio drive establishing control effective to establish a ratio, a control to reduce the engine speed during establishment of a ratio.

Another object of the invention is to provide in a power plant including a governor controlled engine and a transmission, a control system for establishing a ratio drive in a transmission and in forward and reverse direction, and a control system for reducing engine speed on a shift between forward and reverse drive, which will not effect engine speed on a shift from neutral to either forward or reverse drive.

These and other objects of the invention will be more apparent from the following description and drawings illustrating the preferred embodiments of the invention.

FIG. 3 and FIG. 3a, when arranged in accordance with the diagram shown in FIG. 4, illustrate diagrammatically the hydraulic control system for the transmission.

Figure 1:
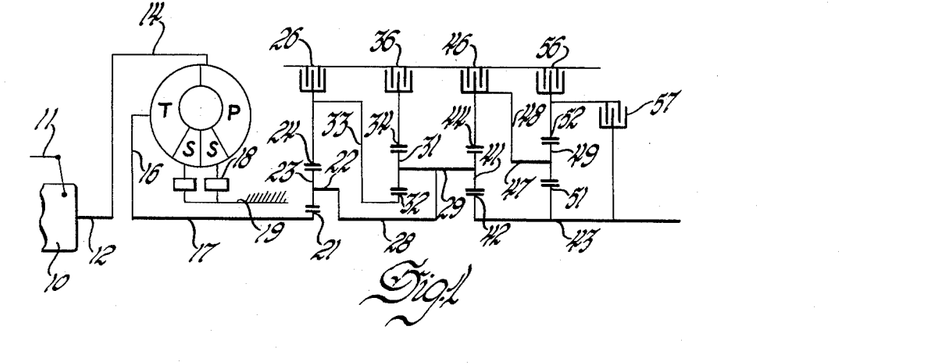
FIG. 1 diagrammatically illustrates the power plant including the engine and the transmission drive.

The power plant and transmission drive train illustrated in FIG. 1 shows an engine 10 having a fuel control 11. The engine drives the input shaft 12 and the torque converter housing 14. The housing has fixed thereto the torque converter pump P which circulates the fluid in the torus chamber to drive the turbine T which is connected by a hub 16 to an intermediate shaft 17. The stators S are connected by one-way brakes 18 to a ground sleeve 19. The intermediate shaft 17 drives the sun gear 21 of the forward and reverse planetary gear unit. The forward planetary gear set includes the carrier 22 having pinions 23 meshing with the sun gear 21 and a ring gear 24 which, to establish forward drive, is held stationary by the fluid operated friction device or brake 26. The carrier 22 is connected by a shaft 28 to the input carrier 29. The reverse planetary gear set has a plurality of pinions 31 mounted on the input carrier 29 which mesh with a sun gear 32 connected by the disc 33 to the ring gear 24 and a ring gear 34 connected to the fluid operated friction device 36 which is engaged to establish reverse drive through the reverse gear set and the forward gear set.

The carrier 29 provides either a forward or a reverse input to the three-speed gear set. The carrier 29 has a plurality of planetary pinions 41 meshing with a sun gear 42 fixed to the output shaft 43 and a ring gear 44 controlled by the third ratio fluid operated friction device or brake 46. When the brake 46 is engaged, it will be seen that the three ratio gear unit operates in third ratio or overdrive. The second ratio planetary gear unit has a planetary carrier 47 connected by a disc 48 to the ring gear 44 and carrying a plurality of planetary pinions 49 meshing with a sun gear 51 on the output shaft 43 and a ring gear 52 controlled by the fluid operated friction device or brake 56. The engagement of brake 56 provides an intermediate overdrive in second ratio. The clutch 57 is engaged to connect the ring gear 52 to the output shaft 43 to provide first ratio or direct drive, the low speed drive of the three-speed gear unit.

Governor

Figure 2:
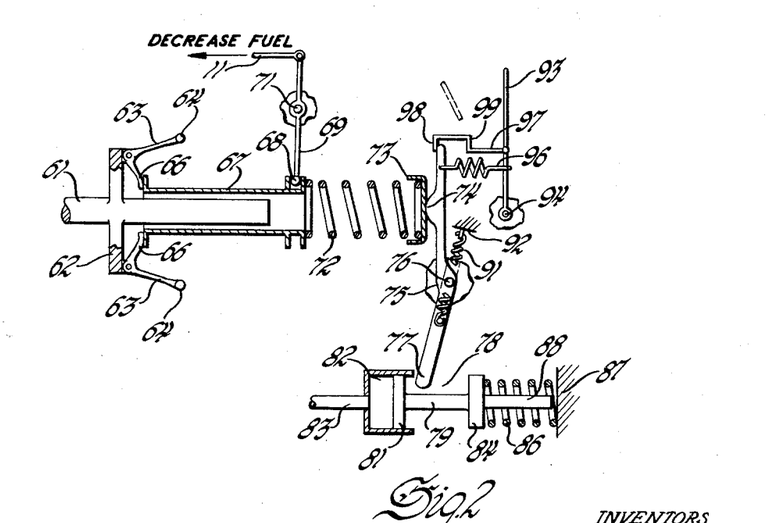
FIG. 2 diagrammatically illustrates the engine governor.

The governor control system for the engine 10, illustrated in FIG. 2, has a shaft 61 driven at a speed proportional to engine speed. Shaft 61 has a pair of arms 62 to provide a pivotal support for the bellcrank levers 63. Each bellcrank lever 63 is centrally pivoted to an arm 62 and has at its outer end a weight 64 and at its inner end a pad 66 which engages the control sleeve 67. The control sleeve 67 has an annular groove 68 forming a connection between the sleeve and lever 69 which is pivoted at 71 to the housing and actuates the fuel control linkage of the engine 10. A speeder spring 72 engages the control sleeve and is supported by a seat 73 suitably guided in the housing not shown for adjusting movement by the cam portion 74 on the bellcrank lever 75. The bellcrank lever 75 is centrally pivoted at 76 to the housing and has one arm having cam 74 and another arm having an end portion 77 located in the axially extending recess 78 on the piston member 79. The piston member 79 has a piston 81 located in a cylinder 82 supplied with fluid by the line 83 and a spring head 84 engaged by a spring 86 abutting the housing 87. The pin portion 88 of the piston member 79 limits movement of the member under the influence of fluid pressure in a direction opposing spring 86. A balancing spring 91 is secured to the arm 77 and extends across the pivot 76 in the idle position shown to an anchor 92 on the housing. When the lever 75 is moved from the idle position shown, counterclockwise toward the full throttle position, the spring 91 provides increasing force to counteract the increased reaction force of the spring 72. The position of lever 75 is manually adjusted by a manual lever 93 pivoted on the pin 94 on the housing. The manual lever 93 is connected to the lever 75 by a preloaded compression spring 96 and a lost motion stop 97 having a normal stop 98 and the limited stop 99.

*Governor Operation*

The governor control system is illustrated in the idle position. The manual control lever 93 may be moved to any position from the idle position shown to the full speed position shown by the dotted line. During normal movement of the lever 93 the compression spring 96 exerts a force greater than the reaction of the speed spring 72 as diminished by the balancing spring 91 to maintain the lever 75 in contact with the normal stop 98 providing positive operator control. As the lever 75 rotates counterclockwise so that the cam portion 74 moves to seat 73 to increase the pressure of the speeder spring 72 on sleeve 67, the balancing spring 91 moves out of alignment with pivot 76 and provides an increasing balance force proportional to the increasing speeder spring force but always somewhat less, so that the total reaction force is less than the preload of compression spring 96. The governor operates in the conventional manner. On overspeed the weight 64 will move away from the axis of rotation to move the control sleeve 67 down to decrease the fuel supply. Conversely, during an underspeed condition the weight 64 will move inwardly permitting the control sleeve 67 to move upwardly to move the linkage 11 in the opposite direction for increased fuel supply. Thus, the governor will regulate the engine at a constant speed set in accordance with the speed setting of the lever 93. During normal operation a pressure supplied by line 83 will hold the piston member 79 in the position shown with the spring 86 compressed and stop 88 engaging housing 87. The lever 77 may, during this phase of operation, swing freely in the slot 78. At full throttle or full speed, the lever 77 will be in a lower portion of the slot 78 adjacent head 84. Then venting of the pressure in the cylinder 82 will permit the spring 86 to raise the piston member 79 so that the portion 84 engages lever 77 to rotate it toward a low speed position and thus decrease the fuel supply to reduce the engine speed.

*Control System*

Figure 3:
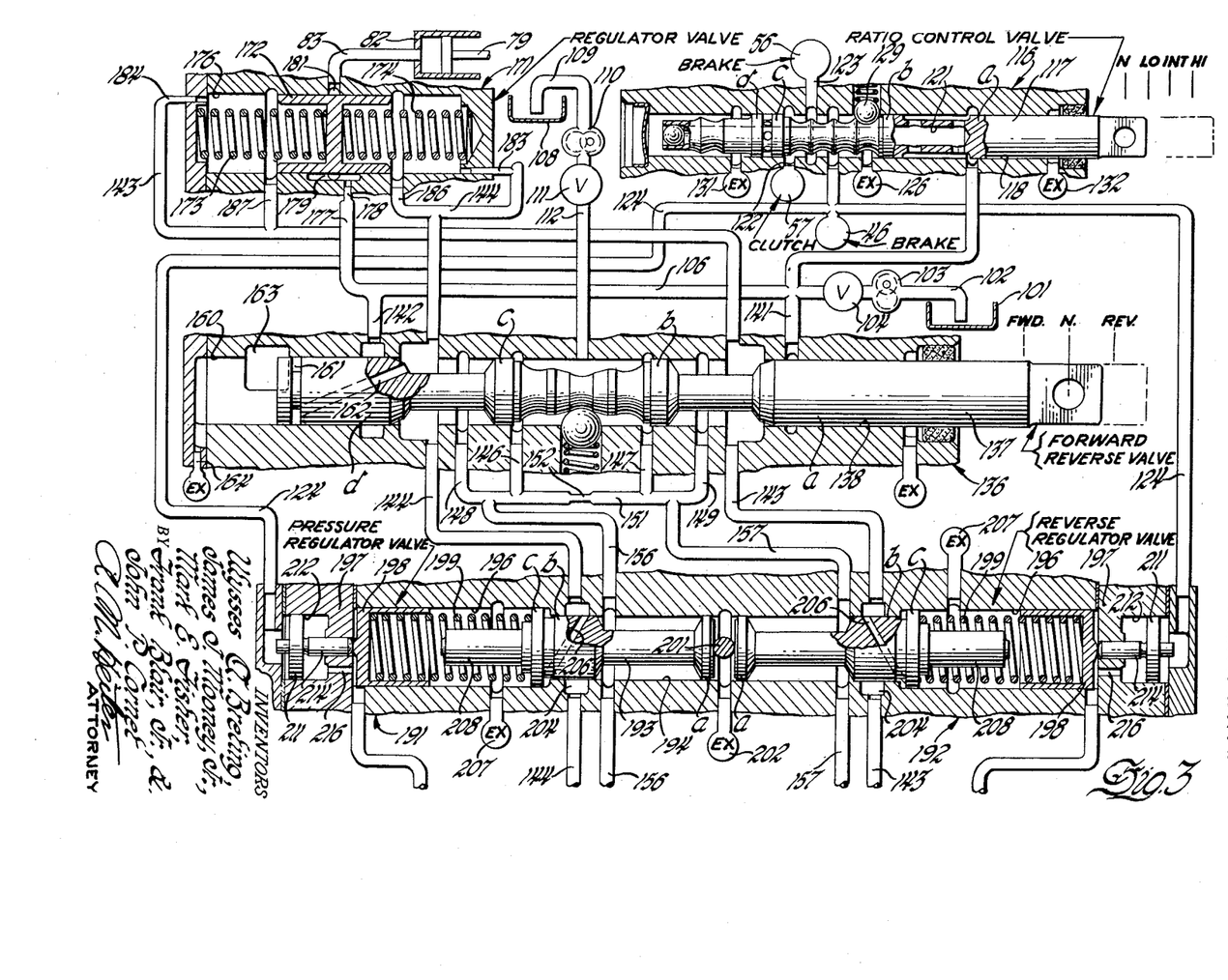
Figures 3A, 4:
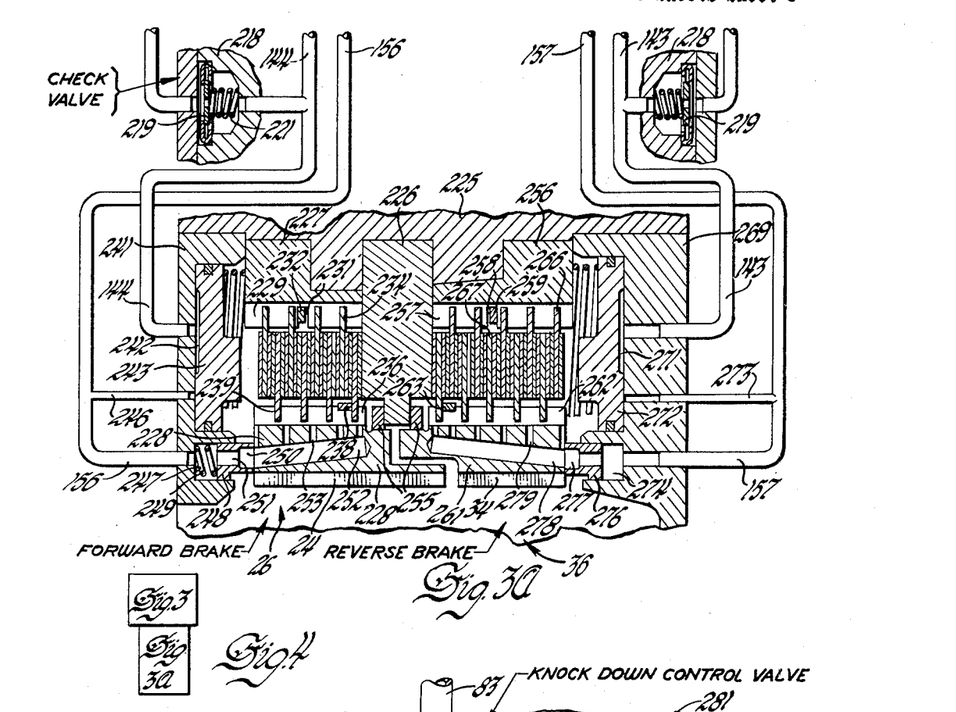

The hydraulic control system for this transmission is shown in FIG. 3 and FIG. 3a. The fluid employed for engaging the ratio engaging devices is supplied from a sump 101 via an intake line 102 to a pump 103 which is generally driven by the engine. The pressure of fluid supplied by pump 103 is regulated by regulator valve 104 and distributed by the main line 106. A second or auxiliary fluid supply for cooling and lubricating is supplied from a sump 108 by an intake line 109 and pump 110. The pump 110 supplies fluid under pressure through a pressure limiting valve 111 to a cooling supply line 112. Since the line 112 is generally exhausted at the point where oil is freely sprayed over the friction clutch and brake elements the valve 111 is a pressure limiting valve to prevent excessive pressures when the flow is restricted by cold oil, etc.

*Ratio Control Valve*

The main line 106 is connected to the ratio control valve 116 which may be moved manually from the neutral position to the low, intermediate and high positions to supply fluid respectively to the low, intermediate and high fluid operated ratio engaging devices 57, 56 and 46. Valve 116 consists of a valve member 117 slidably mounted in the bore 118. The main line 106 is always connected to the space between the lands $a$ and $b$ and supplies fluid via the passage 121 through the center of the valve 117 to the space between the lands $c$ and $d$. With the valve in the neutral position shown, the flow of fluid is stopped between the lands $c$ and $d$ and the low, intermediate and high lines 122, 123 and 124 are vented at exhaust 126. On movement of the valve to the low, intermediate and high positions, fluid flows between lands $c$ and $d$, respectively, to the low 57, intermediate 56 and high 46 ratio engaging devices to establish the ratio, the other lines being connected to exhausts 126 and 131. The valve is held in each position by the detent consisting of a ball 129 which is resiliently urged in the grooves of the valve member 117. The exhaust 131 also prevents accumulation of pressure at the inner end of the valve. The exhaust 132 prevents leakage from the valve body at the other end of the valve.

*Forward and Reverse Valve*

The main line 106 is also connected to the forward and reverse valve 136 which consists of a valve member 137 having lands $a$, $b$, $c$ and $d$ located in a bore 138 of uniform diameter. The cooling fluid line 112 is connected to the center of the valve between the lands $b$ and $c$ in all valve positions. The main line 106 has a branch 141 blocked by the land $a$ and a branch 142 blocked by the land $d$, when the valve is in the neutral position shown. The reverse line 143 is connected to an elongated port in the valve bore 138 adjacent the land $a$ while the forward line 144 is connected to an elongated port adjacent the land $d$. The forward and reverse normal flow cooling lines 146 and 147 are located between the lands $c$ and $b$ and adjacent the respective lands. The auxiliary forward cooling line 148 is located between the lands $c$ and $d$ and the auxiliary reverse cooling line 149 is located between the lands $a$ and $b$. The cross line 151 interconnects both the normal and the auxiliary cooling lines and has an orifice 152 between the forward and the reverse lines. The cross cooling line 151 at the forward side is connected to the forward cooling line 156 and at the reverse side to the reverse cooling line 157.

The land $d$ of valve member 137 operates in the closed end 160 of the bore 138 and provides operator feel of the pressure being supplied to the clutch for a portion of the travel from neutral to the forward position and thereafter a constant resistance to movement without exerting a force tending to return the valve to the neutral position. The feel mechanism includes an annular recess 161 in the land $d$, a bore 162 connecting the recess 161 to the space between the lands $c$ and $d$, the blind port 163 in the bore 138, and an orifice exhaust 164 at the end of bore 160. With the valve in the neutral position the communication between the space between the lands $c$ and $d$ and the end of the bore 160 via bore 162, recess 161 and port 163 is cut off because recess 161 moves beyond port 163 so that any pressure in the end of the bore 160 will exhaust via orifice 164 to prevent any feel or reaction force tending to move the valve at the neutral position. As soon as valve 137 is moved from the neutral toward the forward position, the pressure between the lands *c* and *d* communicates via bore 162, recess 161 and port 163 to the space at the end of the valve bore 160 faster than the fluid can escape through the orifice exhaust 164 so that a fluid pressure is created in the end of the bore 160 to provide a force resisting movement of the valve 137 toward the forward position. As the valve approaches the forward position, the end of the land *d* will pass the port 163 and prevent communication through the land *d* through the bore 163 and the recess 161. Thereafter, valve movement is controlled by the size of the orifice exhaust 164. Though there will be a resistance to movement there will not be a reaction force tending to return the valve to neutral position so the valve will rest in forward position.

*Knockdown Regulator Valve*

The knockdown regulator valve 171 has a valve element 172 centrally located between a pair of springs 173 and 174 located in a bore 176 which is closed at both ends. With the valve in the normal position shown the main line 106 via branch 177 is connected through an orifice 178 to an axially extending port 179 which crosses an annular port 181 at the center of the valve. Thus, the main line 106 is normally connected through the orifice 178 to the line 83 to actuate the piston 79 to permit normal operation of the speed governor. The forward line 144 and the reverse line 143 are connected respectively by unrestricted lines 186 and 187 to the bore 176 at opposite ends of the valve 172 when in the central position shown. The forward line 144 and reverse line 143 are also connected respectively through orifices 183 and 184 to the opposite ends of the bore 176.

During a shift from the neutral to either the forward or reverse position, the knockdown valve 171 maintains pressure in the line 83. On a shift, for example from neutral to forward, pressure is supplied to the forward line 144 which will enter through the unrestricted passage 186 and move the valve member 172 to the left to provide direct communication via axial port 179 and annular port 181 to the line 83 supplementing the pressure supplied from line 177 to line 83. Since line 83 is not exhausted, there is no engine knockdown. Then when the transmission is shifted from forward to either neutral or reverse the forward clutch line 144 will be exhausted at the forward reverse selector valve. At this time while valve 172 is in the left portion of bore 176 the line 83 will be exhausted via port 181, line 186, and forward line 144 to exhausts 148 and 146. This exhaust will continue while the valve member 172 moves back to the central position on a shift to neutral under the influence of springs or a shift to reverse under the influence of reverse line pressure entering the bore 176 via the orifice 184 until the valve 172 closes the axial bore 179. At this time the member 79 will be in the knockdown position. When a shift from forward to reverse is being made, the flow through orifice 184 and the springs move the valve 172 slowly during engine knockdown and until line 187 opens. Then the valve will be moved quickly after this interval of knockdown to supply fluid via the axial port 179 to the line 83 to return the knockdown member 79 to the normal position.

*Pressure Regulator Valve*

The control pressure directed to the forward brake 26 by the forward line 144 is controlled by a forward pressure regulator valve 191 and the pressure directed to the reverse brake 36 by the line 143 is controlled by the reverse regulator valve 192. Since these valves are the same and function in the same manner, one for forward and one for reverse, the following description and like reference characters describe both valves. The regulator valve element 193 has small lands *a* and *b* located in the small bore 194 and a large land *c* located in the large bore 196. The bore 196 is closed by a member 197 and has an abutment piston 198 which forms a seat for the spring 199 which engages the land *c* and urges the valve member 193 into engagement with a stop pin 201. The cooling lines 156 and 157 are connected through the bore 194 between lands *a* and *b* and adjacent land *b* of the forward regulator valve 191 and the reverse regulator valve 192 respectively. The forward line 144 and the reverse line 143 are connected by an annular port 204 around the land *b* so that the land *b* does not block lines 144 and 143. The port 204 is always connected via bore 206 to a space between the lands *b* and *c* to act on the unbalanced area of land *c* to provide a force proportional to the pressure in line 144 opposing the spring biasing force on the valve. The exhausts 202 and 207 prevent the accumulation of leakage fluid in the bore 196. The stem 208 will be engaged by the piston 198 and prevent bottoming out of spring 199.

The low regulated pressure of the regulator valves 191 and 192 may be modified by a piston 211 located in a cylinder 212 in member 197 which may be actuated by the pressure supplied by the ratio line 124 to move the piston 211 and the stem 214 to change the normal position of the abutment 198. The bleed port 216 between the cylinder 212 and the end bore 196 prevents the accumulation of leakage fluid behind the piston 211 interfering with the operation of this piston. The forward line 144 and the reverse line 143 are connected through an orifice check valve 218 to the bore 196 beneath the abutment piston 198. The valve 218 consists of an orificed plate 219 permitting restricted flow to bore 196 during operation of the regulator valve and a spring 221 permitting opening of the valve to permit full flow in a reverse direction to exhaust the bore 196 beneath piston 198 to reset the regulator valve for another cycle of regulation.

*Forward and Reverse Brakes*

The forward brake 26 and reverse brake 36, shown in detail in FIG. 3a, are mounted in a portion of the transmission housing 225, having a fixed abutment 226 between the brakes. Brake 26 has an outer splined drum 227 fixed to the housing and an inner splined drum 228 connected to the ring gear 24 and the disc 33 connected to the sun gear 32. The drum 227 has splines 229 having an annular recess 231 centrally located in the splines and receiving a snap ring 232 having a width less than the width of the recess. The fixed brake plates 234 are connected to the splines 229. The inner drum 228 has splines 236 having a recess to receive the snap ring 238. The rotating brake plates 239 engage the spline 236. The snap rings 232 and 238 cooperate with brake plates 234 and 239 to locate inner drum 228 having ring gear 24 for proper alignment with planetary pinions 23. When the brake is engaged snap ring 238 is located between two plates 239. When the brake is disengaged movement to the right is limited when snap ring 238 contacts the plate 239 engaging abutment 226 and on movement to the left when snap ring 238 engages the plate 239 to the left to move a plate 234 to contact snap ring 232. The housing 241 has a cylinder 242 for the piston 243 which engages the brake plates 234, 239. Forward line 144 is connected to the cylinder 242. A restricted bypass 246 connects cylinder 242 to the cooling line 156. Cooling line 156 is connected to an annular recess 247 having an annular transfer bushing 248 urged in sealing contact with the facing annular wall of inner drum 228 preferably only by fluid pressure in recess 247 acting on the unbalanced area of the bushing 248. Since recess 250 is narrower than the face of bushing 248 in recess 247 and there is a pressure drop across apertures 251, the bushing is biased to contact drum 228 by the cooling fluid. A plurality of springs 249 may also be used. The transfer ring 248 has a plurality of apertures 251 and an annular recess 250 connecting line 156 with the passages 252 in the drum 228 to supply brake cooling fluid via a plurality of radial passages 253 to the brake. Seals 255 between drum 228 and 261 and abutment 226 prevent leakage of cooling fluid from one brake to the other and to the gearing. It will be noted that bushing 248 seals the other side of the chamber containing the brake plates. The cooling fluid exhausts at the bottom of the housing to the sump.

The reverse brake 36 has an outer drum 256 fixed to the housing 225 and having splines 257 having an annular recess 258 receiving a snap ring 259 narrower than the recess. The inner drum 261 has splines 262 having a snap ring 263 fitting into a recess in the splines. The fixed plates 266 are connected to the fixed splines 257 while the rotating plates 267 are connected to the splines 262. The snap rings 259 and 263 act similar to the snap rings 232 and 238 to prevent excessive axial movement of inner drum 261 and ring gear 34. The housing has a portion 269 fixed to the part 225 which has a cylinder 271 for the piston 272. The reverse line 143 is connected to the piston cylinder 271 and the restricted passage 273 connects the piston to the cooling line 157. The cooling line 157 is also connected to an annular recess 274 in member 269. An annular transfer bushing 276 fits in the recess 274 and has passages 277, like apertures 251 and recess 250 in transfer bushing 248, to connect the cooling line 157 to the bore 278 in the rotary member 261. Bore 278 is connected by a plurality of radial passages 279 to supply cooling fluid to the plates 266–267. A pin may be employed to prevent rotation between bushings 248 and 276 and the housing.

*Modified Knockdown Valve*

Figure 5:
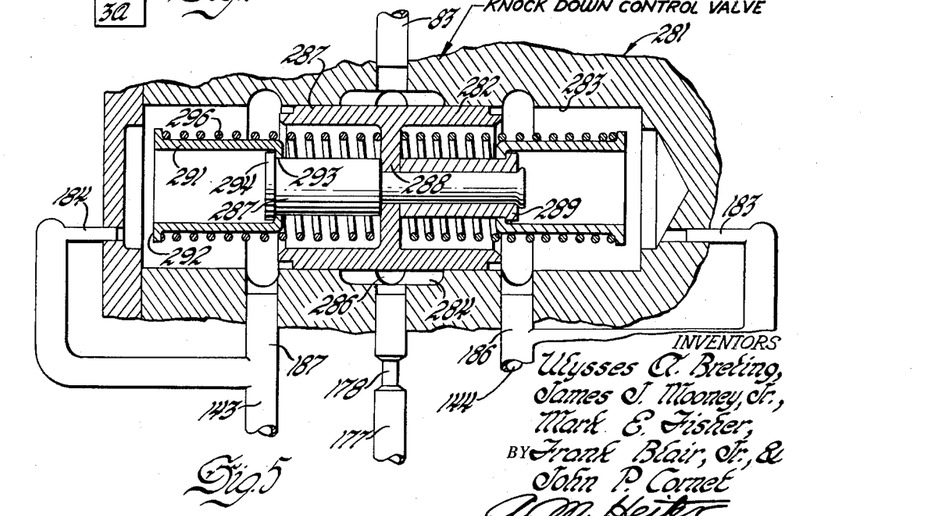
FIG. 5 shows an alternative governor knock-down control valve.

A modified knockdown control valve 281, illustrated in FIG. 5, has a valve member 282 reciprocally mounted in the bore 283. A branch of the main line 177 is similarly connected through an orifice 178, the axial port 284 and the circumferential port 286. At the other side of the valve knockdown control line 83 is connected to the knockdown motor 82. The valve member 282 has a cylindrical land portion 287 and a central transverse wall 288 on which is mounted a guide 289 extending on both sides of the wall. The spring retainers 291 have a cylindrical shape with a shoulder 292 at the outer end providing a spring seat and a shoulder 293 at the inner end slidably mounted on the guide 289 and engaging a shoulder 294 on the guide to limit output movement of the spring seat 292. The preloaded spring 296 abuts the central wall 288 and the shoulder 292 and normally biases the retainer 291 to the position shown. The reverse line 143 is similarly connected to the valve bore 283 via unrestricted line 187 at the edge of the valve 282 in the normal position and by restricted port 184 to the closed end of the valve bore. The forward line 144 is similarly connected at the opposite end by unrestricted line 186 at the other end of valve member 282 and a restricted port 183 at the opposite closed end of the valve bore 283. The valve 281 functions hydraulically in the same manner as valve 171, FIG. 3a, except for the improved operation of the centering springs 296. This spring arrangement provides a higher centering force since at any time only one spring in compression acts on the movable valve member 282 and the spring at the opposite end of the valve is inactive. Thus, in this modification the full force of one spring provides the centering force.

*Operation*

When the engine 10 is started, the governor control lever 93 is moved from the idle position to the desired speed position, for example, the full speed position shown in dotted lines. The lever 93 through the preloaded spring 96 will move the lever 75 to load the speeder spring 72. The control sleeve 67 will thus be biased in accordance with the speed repsonsive force of the weights 64 and the force of spring 72 to control the fuel control linkage 11 for a constant governed engine speed in accordance with the speed setting of the lever 93. Then in order to establish a transmission drive the manual ratio control lever valve 116 is positioned in low, intermediate or high position to engage the low or direct drive clutch 57, the second or intermediate overdrive brake 56 or the third or overdrive brake 46 of the three-speed gear unit.

Then in order to establish drive the forward and reverse selector valve is moved from neutral to either the forward or the reverse position. In the neutral position the forward-reverse valve 136 is in the central position shown connecting the forward and reverse lines 144 and 143 to the auxiliary cooling lines 148 and 149 respectively and the cooling supply line 112 between the lands $b$ and $c$ to the normal cooling lines 146 and 147. These normal and auxiliary cooling lines are connected by the cross line 151 to the forward cooling line and the reverse cooling line, 156 and 157 respectively. These lines pass respectively between the lands $a$ and $b$ of the forward regulator valve 191 and the reverse regulator valve 192 to supply both the forward and reverse brakes 26 and 36 with cooling and lubricating oil. When the manual forward and reverse selector switch valve 136 is moved from neutral toward the forward position the land $b$ blocks line 147 so that th complete supply of cooling fluid from line 112 passes via normal cooling line 146 to the cross line 151. The movement of the forward and reverse valve member 137 also moves land $d$ to open the main line 142 to flow between the lands $c$ and $d$ to the forward line 144 and the normal cooling line 148. The restriction 152 causes most of the oil to flow through the forward cooling line 156 and only a small portion is permitted to flow through the restriction 152 to reverse cooling line 157.

At this time the pressure between the lands $c$ and $d$ is connected through bore 162, groove 161 and port 163 to fill the end of valve bore 169 to provide a reaction or feel so that the operator can judge the force with which the brake is being engaged. The orifice 164 is smaller than passage 162 and thus does not effect this phase of the operation.

The forward line 144 is also connected at the forward regulator valve 191 by the bore 206 in land $b$ to the space between the lands $b$ and $c$ to act on the unbalanced area of land $c$ and thus moves the valve 193 to the left pressing the spring 199 to vent the forward line 144 to the cooling line 156. Thus, the cooling flow is augmented during the initial period of clutch application where due to the high slip a large quantity of heat is generated. The line 144 is also connected around the land $b$ by the annular port 204 and supplied through the orifice plate 219 to the end of the bore 196 of the regulator valve 191 to lift the spring abutment piston 198 slowly to increase the pressure regulated by the valve 191. Since with increasing line pressure an increasing volume of fluid flows through the orifice plate the spring biasing force and the pressure is increased at an increasing rate until the piston 198 engages valve 193 and then the pressure increases substantially instantaneously to full line pressure. The friction devices are softly but fully engaged to stop slip during the gradual pressure rise. The terminal pressure rise provides a factor of safety to prevent slip during all phases of operation. When the forward brake is released the spring 199 returns the piston 198 to the position shown quickly, since this pressure lifts the plate 219 to open the check valve 218. Line 144 is connected to the cylinder 242 to operate the piston 243 to engage the forward brake 26. The cylinder 242 is also connected by restricted passage 246 to the cooling line 156 to supply additional cooling fluid whenever the brake 26 is being engaged.

The shift from the reverse position to the forward position operates in the same manner as the above described shift from neutral to the forward position.

The shift from either neutral or forward to reverse is effected by moving the forward and reverse valve 137 to the reverse position. Then the main line branch 141 is connected between lands *a* and *b* to reverse line 143 and auxiliary cooling line 149. Continued movement of valve 137 throttles line 149 and increases the pressure supplied to reverse line 143. The cooling supply line 112 is similarly connected by normal cooling line 147. The normal and auxiliary cooling lines are connected by cross line 151 to reverse cooling line 157. The reverse regulator valve 192 similarly controls reverse engaging pressure and augments the supply of cooling fluid during the period of slipping engagement. Bypass 273 augments the cooling supply during engagement of the reverse brake.

When transmissions of this type are used in heavy duty applications such as earth moving machinery where repeated forward to reverse shifts under full load are required, the friction devices employed to establish the forward and reverse ratios must have a high capacity cooling system. In order to reduce the power loss the full volume of cooling fluid is not pumped at all times, but a normal cooling fluid supply is augmented during certain phases of transmission operation. The normal cooling fluid supply, line 112, is controlled by the forward and reverse valve 136, the lines, and orifice 152 to deliver a major part of the cooling fluid supply to the friction device being engaged or fully engaged and a minor portion to the friction device which is disengaged. During the initial portion of engagement where slip between the friction members occurs, the cooling fluid supply is augmented by an auxiliary cooling fluid supply from the manually controlled forward and reverse valve 136 and from the automatically operating regulator valve 191 or 192. The cooling fluid supply is also augmented by restricted passages 246 or 273 whenever the friction devices are being engaged or are engaged. The augmented supply of cooling fluid is supplied from the control system at times when excess fluid is available. This system provides maximum flow during slipping engagement, a medium flow during engagement and a minimum flow when the friction device is disengaged.

When the three-speed gear unit and transmission is in high, the initial regulated pressure for both valves 191 and 192 will be higher than in low or intermediate. It will be noted that when the selector valve is in high position that the main line 106 is connected to the high ratio line 124 which is connected to the cylinder 212 in each of the regulator valves 191 and 192. When fluid under pressure is supplied via line 124 the piston 211 is moved toward the piston 198 to lift the piston from the wall 197. Thus, the initial pressure regulated by the valves 191 and 192 is higher. Thereafter the pressure is raised in the same manner as above described by fluid flowing from the clutch supply line through the orifice plate 219 to the bore 196 to further lift the piston 198 to provide additional spring force on the valve 193.

With the forward and reverse selector valve 136 in neutral position shown, the main supply line 106 is connected via line 177 and orifice 178, axial passage 179 and annular passage 181 and line 83 to the cylinder 82 to hold the knockdown member 79 in the position in which it does not affect the operation of the governor. Since on a shift from neutral to either forward or reverse the port 181 is not connected to the unrestricted or free line 187 or 186, the fluid in line 83 is not vented to provide engine knockdown during this shift. However, on a shift from forward to neutral or reverse engine knockdown occurs. On this shift the valve member 172 is initially at the left end of the bore 176 providing a free connection between axial port 179 and free line 186. When the forward brake is engaged the pressure in line 144 is supplied via free port 186 to retain the valve in this position. On the shift to reverse the line 144 is immediately connected to exhaust via the cooling lines 148 and 156 and the pressure thus drops permitting pressure in line 83 and cylinder 82 to drop. Then the spring 86, FIG. 2, moves the knockdown member 79 to the knockdown position. If the manual lever 93 of the governor is in the full throttle position, the end 77 of lever 75 would be closely adjacent abutment 84 on the member 79. Then on upward movement of the member 79 to the knockdown position the abutment 84 will swing the lever 75 from a full or high speed setting to a predetermined low speed setting or idle setting. If the manual lever 93 is in a low speed or idle position, the abutment would merely prevent movement to a high speed position. As the reverse brake is being engaged reverse brake line 143 will supply fluid through the orifice 184 to move the valve 172 slowly to the right to first close the axial port 179 and permit a buildup of pressure from line 177 through orifice 178 to return member 79 to the normal position in which it does not interfere with the operation of the governor. When the valve member 172 reaches the center position full flow of fluid from line 143 via free line 187 will quickly move the valve member to the opposite end of the bore and connect line 187 via line 83 to the motor. If the orifice 178 is small this pressure will provide the movement returning member 79 to the normal ineffective position.

The above description and drawings illustrate a preferred embodiment of the invention. It will be appreciated that further modifications may be made within the scope of the appended claims.

We claim:

1. In a power plant, an engine having a fuel feed, governor means having a speed setting device and controlling said fuel feed to provide constant speed engine operation at the speed indicated by said speed setting device, a transmission having a first and a second fluid operated drive control device and connecting said engine to a load, a source of fluid under pressure, a shift control valve operative on movement from a neutral position to a first or a second position to connect said source respectively to operate said first or second fluid operated drive control device to engage first or second drive, said governor having knockdown means operative to hold the speed setting of said setting device to a low value, knockdown control means operative during a shift of said shift control valve from neutral to first or second rendering said knockdown means inoperative during said shift and responsive to a shift of said shift control valve from first to second and on a shift from second to first rendering said knockdown means operative to momentarily hold the speed setting of said setting device to a low value during the shift interval and thereafter render said knockdown means inoperative.

2. In a power plant, an engine having a fuel feed, governor means having a speed setting device and controlling said fuel feed to provide constant speed engine operation at the speed indicated by said speed setting device, a transmission having a first and a second fluid operated drive control device each having an operating chamber and connecting said engine to a load, a source of fluid under pressure, a control valve operative on movement from a neutral position to a first or a second position to connect said source respectively to said first or second operating chamber to engage first or second drive and to exhaust the other operating chamber, said governor having knockdown means normally biased to reduce the speed setting of said setting device to a low value and disabled by fluid under pressure, knockdown valve means movable from a neutral position to a first and a second position and in neutral and intermediate positions connecting said source through a restriction to said knockdown means to disable said knockdown means, and in first position connecting said first operating chamber freely to said knockdown means and a second position connecting said second chamber freely to said knockdown means, means connecting said control valve to said knockdown valve means to shift said knockdown valve means between neutral, first or second positions with said control valve, and said knockdown valve means on movement from neutral to either first or second position maintaining said restricted connection from said source to said knockdown means and providing in first and second a free connection from the respective first or second chamber to said knockdown means to disable said knockdown means, and during movement from first to second or second to first momentarily exhausting fluid from said knockdown means to cause said knockdown means to reduce engine speed.

3. In a power plant, an engine having a fuel feed, governor means having a speed setting device and controlling said fuel feed to provide constant speed engine operation at the speed indicated by said speed setting device, a transmission having a forward and a reverse fluid operated drive control device each having an operating chamber and connecting said engine to a load, a source of fluid under pressure, a control valve operative on movement from a neutral position to a forward or a reverse position to connect said source respectively to said forward or reverse operating chamber to engage forward or reverse drive and to exhaust the other operating chamber, said governor having knockdown means normally biased to reduce the speed setting of said setting device to a low value and disabled by fluid under pressure, knockdown valve means movable from a neutral position to a forward and a reverse position and in neutral and intermediate positions connecting said source through a restriction to said knockdown means to disable said knockdown means, and in forward position connecting said forward operating chamber freely to said knockdown means and a reverse position connecting said reverse chamber freely to said knockdown means, means connecting said control valve to said knockdown valve means to shift said knockdown valve means between neutral, forward or reverse position with said control valve, and said knockdown valve means on movement from neutral to either forward or reverse position maintaining said restricted connection from said source to said knockdown means and providing in forward and reverse a free connection from the respective forward or reverse chamber to said knockdown means to disable said knockdown means, and during movement from forward to reverse or reverse to forward momentarily exhausting fluid from said knockdown means to cause said knockdown means to reduce engine speed.

4. In a power plant, an engine having a fuel feed, governor means having a speed setting device and controlling said fuel feed to provide constant speed engine operation at the speed indicated by said speed setting device, a transmission having a forward and a reverse fluid operated drive control device and connecting said engine to a load, a source of fluid under pressure, a control valve operative on movement from a neutral position to a forward or a reverse position to connect said source respectively to said forward or reverse fluid operated drive control device to engage forward or reverse drive and to exhaust the other fluid operated friction drive control device, said governor having knockdown means normally operative to reduce the speed setting of said setting device to a low value, knockdown valve means having a neutral position connecting said source to said knockdown means to disable said knockdown means, means connecting said control valve to said knockdown valve means responsive on a shift of said control valve from neutral to forward or reverse to move said knockdown valve means respectively to forward or reverse and on a shift of said control valve from forward to reverse to move said knockdown valve means from forward to reverse and on a shift of said control valve from reverse to forward to move said knockdown valve means from reverse to forward, and said knockdown valve means on movement from neutral to either forward or reverse maintaining said connection from said source to said knockdown means and during movement from forward to reverse or reverse to forward momentarily disconnecting said source from said knockdown means to cause said knockdown means to reduce engine speed.

5. In a transmission, a forward and a reverse fluid operated friction engaging device each having an operating chamber and operative on the supply of fluid under pressure to an operating chamber to engage forward or reverse drive, forward and reverse cooling means to supply cooling fluid respectively to said forward or reverse friction engaging devices, a first source of operating fluid under pressure, a second source of cooling fluid under pressure, a manual selector valve operative in all forward positions to connect said first source to said forward operating chamber and said second source to said forward cooling means and operative in all reverse positions to connect said first source to said reverse operating chamber and said second source to said reverse cooling means, and said manual selector valve being operative in partial forward positions to connect said first source to said forward cooling means and in partial reverse positions to connect said first source to said reverse cooling means to augment the supply of cooling fluid during the transition from disengagement to engagement of the friction engaging devices.

6. In a transmission, a forward and a reverse fluid operated friction engaging device each having an operating chamber and operative on the supply of fluid under pressure to an operating chamber to engage forward or reverse drive, forward and reverse cooling means to supply cooling fluid respectively to said forward or reverse friction engaging devices, a first source of operating fluid under pressure, a second source of cooling fluid under pressure, a manual selector valve operative in all forward positions to connect said first source to said forward operating chamber and said second source to said forward cooling means and operative in all reverse positions to connect said first source to said reverse operating chamber and said second source to said reverse cooling means, said manual selector valve being operative in partial forward positions to connect said first source to said forward cooling means and in partial reverse positions to connect said first source to said reverse cooling means to augment the supply of cooling fluid during the transition from disengagement to engagement of the friction engaging devices, and a restricted passage connecting said forward and reverse cooling means to supply a small portion of the fluid supplied to one cooling means to the other cooling means.

7. In a transmission, a forward and a reverse fluid operated friction engaging device each having an operating chamber and operative on the supply of fluid under pressure to an operating chamber to engage forward or reverse drive, forward and reverse cooling means to supply cooling fluid respectively to said forward or reverse friction engaging devices, a first source of operating fluid under pressure, a second source of cooling fluid under pressure, a manual selector valve operative in all forward positions to connect said first source to said forward operating chamber and said second source to said forward cooling means and operative in all reverse positions to connect said first source to said reverse operating chamber and said second source to said reverse cooling means, said manual selector valve being operative in partial forward positions to connect said first source to said forward cooling means and in partial reverse positions to connect said first source to said reverse cooling means to augment the supply of cooling fluid during the transition from disengagement to engagement of the friction engaging devices, and restricted passage means connecting the operating chamber of each friction device to the cooling means for the same friction engaging device to augment the cooling fluid supply during engagement.

8. In a transmission, a forward and a reverse fluid operated friction engaging device each having an operating chamber and operative on the supply of fluid under pressure to an operating chamber to engage forward or reverse drive, forward and reverse cooling means to supply cooling fluid respectively to said forward or reverse friction engaging devices, a first source of operating fluid under pressure, a second source of cooling fluid under pressure, a manual selector valve operative in all forward positions to connect said first source to said forward operating chamber and said second source to said forward cooling means and operative in all reverse positions to connect said first source to said reverse operating chamber and said second source to said reverse cooling means, said manual selector valve being operative in partial forward positions to connect said first source to said forward cooling means and in partial reverse positions to connect said first source to said reverse cooling means to augment the supply of cooling fluid during the transition from disengagement to engagement of the friction engaging devices, and regulator valve means connected to each operating chamber operative on the supply of fluid to engage a friction engaging device to vent fluid to the cooling means of the friction device being engaged to augment the supply of cooling fluid during the transition from disengagement to engagement.

9. In a transmission, a forward and a reverse fluid operated friction engaging device each having an operating chamber and operative on the supply of fluid under pressure to an operating chamber to engage forward or reverse drive, forward and reverse cooling means to supply cooling fluid respectively to said forward or reverse friction engaging devices, a first source of operating fluid under pressure, a second source of cooling fluid under pressure, a manual selector valve operative in all forward positions to connect said first source to said forward operating chamber and said second source to said forward cooling means and operative in all reverse positions to connect said first source to said reverse operating chamber and said second source to said reverse cooling means, said manual selector valve being operative in partial forward positions to connect said first source to said forward cooling means and in partial reverse positions to connect said first source to said reverse cooling means to augment the supply of cooling fluid during the transition from disengagement to engagement of the friction engaging devices, a restricted passage connecting said forward and reverse cooling means to supply a small portion of the fluid supplied to one cooling means to the other cooling means, a regulator valve connected to each operating chamber operative on the supply of fluid to engage a friction engaging device to vent fluid to the cooling means of the friction engaging device being engaged to augment the supply of cooling fluid during the transition from disengagement to engagement, and restricted passage means connecting the operating chamber of each friction engaging device to the cooling means for the same friction engaging device to augment the cooling fluid supply during engagement.

10. In a transmission, a first and a second fluid operated friction engaging device each having a chamber operative on the supply of fluid under pressure to said first or second chamber to engage a first or second drive, first and second cooling means to supply cooling fluid respectively to said first or second friction engaging devices, a first source of operating fluid under pressure, a second source of cooling fluid under pressure, and a manual selector valve operative in a neutral position to connect each operating chamber to the cooling means for the same friction engaging device and to connect said second source to said cooling means and operative on movement from neutral through a range of intermediate, first or second positions to connect said first source respectively to said first or second chamber and first or second cooling means and to gradually cut off flow to said first or second cooling means and increase flow to said first or second chamber to a first or second position cutting off flow from said first source to said first or second cooling means and in all first or second positions connecting said second source to said first or second cooling means respectively.

11. In a transmission, a first and a second fluid operated friction engaging device each having a chamber operative on the supply of fluid under pressure to said first or second chamber to engage a first or second drive, first and second cooling means to supply cooling fluid respectively to said first or second friction engaging devices, a first source of operating fluid under pressure, a second source of cooling fluid under pressure, a manual selector valve operative in a neutral position to connect each operating chamber to the cooling means for the same friction engaging device and to connect said second source to said cooling means and operative on movement from neutral through a range of intermediate, first or second positions to connect said first source respectively to said first or second chamber and first or second cooling means and to gradually cut off flow to said first or second cooling means and increase flow to said first or second chamber to a first or second position cutting off flow from said first source to said first or second cooling means and in all first or second positions connecting said second source to said first or second cooling means respectively, a restricted passage connecting said first and second cooling means to supply a small portion of the fluid supplied to one cooling means to the other cooling means, and restricted passage means connecting the operating chamber of each friction engaging device to the cooling means for the same friction engaging device to augment the cooling fluid supply during engagement.

12. In a transmission, a first and a second fluid operated friction engaging device each having a chamber operative on the supply of fluid under pressure to said first or second chamber to engage a first or second drive, first and second cooling means to supply cooling fluid respectively to said first or second friction engaging devices, a first source of operating fluid under pressure, a second source of cooling fluid under pressure, a manual selector valve operative in a neutral position to connect each operating chamber to the cooling means for the same friction engaging device and to connect said second source to said cooling means and operative on movement from neutral through a range of intermediate, first or second positions to connect said first source respectively to said first or second chamber and first or second cooling means and to gradually cut off flow to said first or second cooling means and increase flow to said first or second chamber to a first or second position cutting off flow from said first source to said first or second cooling means and in all first or second positions connecting said second source to said first or second cooling means respectively, and a regulator valve connected to each operating chamber operative on the supply of fluid to engage a friction engaging device to vent fluid to the cooling means of the friction engaging device being engaged to augment the supply of cooling fluid during the transition from disengagement to engagement.

13. In a transmission, a first and a second fluid operated friction engaging device each having a chamber operative on the supply of fluid under pressure to said first or second chamber to engage a first or second drive, first and second cooling means to supply cooling fluid respectively to said first or second friction engaging devices, a first source of operating fluid under pressure, a second source of cooling fluid under pressure, a manual selector valve operative in a neutral position to connect each operating chamber to the cooling means for the same friction engaging device and to connect said second source to said cooling means and operative on movement from neutral through a range of intermediate, first or second positions to connect said first source respectively to said first or second chamber and first or second cooling means and to gradually cut off flow to said first or second cooling means and increase flow to said first or second chamber to a first or second position cutting off flow from said first source to said first or second cooling means and in all first or second positions connecting said second source to said first or second cooling means respectively, a regulator valve connected to each operating chamber operative on the supply of fluid to engage a friction engaging device to vent fluid to the cooling means of the friction engaging device being engaged to augment the supply of cooling fluid during the transition from disengagement to engagement, and restricted passage means connecting the operating chamber of each friction engaging device to the cooling means for the same friction engaging device to augment the cooling fluid supply during engagement.

14. In a transmission, a first and a second fluid operated friction engaging device each having a chamber operative on the supply of fluid under pressure to said first or second chamber to engage a first or second drive, first and second cooling means to supply cooling fluid respectively to said first or second friction engaging devices, a first source of operating fluid under pressure, a second source of cooling fluid under pressure, a manual selector valve operative in a neutral position to connect each operating chamber to the cooling means for the same friction engaging device and to connect said second source to said cooling means and operative on movement from neutral through a range of intermediate, first or second positions to connect said first source respectively to said first or second chamber and first or second cooling means and to gradually cut off flow to said first or second cooling means and increase flow to said first or second chamber to a first or second position cutting off flow from said first source to said first or second cooling means and in all first or second positions connecting said second source to said first or second cooling means respectively, a restricted passage connecting said first and second cooling means to supply a small portion of the fluid supplied to one cooling means to the other cooling means, a regulator valve connected to each operating chamber operative on the supply of fluid to engage a friction engaging device to vent fluid to the cooling means of the friction engaging device being engaged to augment the supply of cooling fluid during the transition from disengagement to engagement, and restricted passage means connecting the operating chamber of each friction engaging device to the cooling means for the same friction engaging device to augment the cooling fluid supply during engagement.

15. In a transmission, a first and a second fluid operated friction engaging device each having a chamber operative on the supply of fluid under pressure to said first or second chamber to engage a first or second drive, first and second cooling means to supply cooling fluid respectively to said first or second friction engaging devices, a first source of operating fluid under pressure, a second source of cooling fluid under pressure, a manual selector valve operative in all first positions to connect said first source to said first operating chamber and said second source to said first cooling means operative in all second positions to connect said first source to said second operating chamber and said second source to said second cooling means, said manual selector valve being operative in partial first positions to connect said first source to said first cooling means and in partial second positions to connect said first source to said second cooling means to augment the supply of cooling fluid during the transition from disengagement to engagement of the friction engaging devices, a restricted passage connecting said first and second cooling means to supply a small portion of the fluid supplied to one cooling means to the other cooling means, a regulator valve connected to each operating chamber operative on the supply of fluid to engage a friction engaging device to vent fluid to the cooling means of the friction engaging device being engaged to augment the supply of cooling fluid during the transition from disengagement to engagement, and restricted passage means connecting the operating chamber of each friction engaging device to the cooling means for the same friction engaging device to augment the cooling fluid supply during engagement.

16. In a transmission, a first and a second fluid operated friction engaging device each having a chamber operative on the supply of fluid under pressure to said first or second chamber to engage a first or second drive, first and second cooling means to supply cooling fluid respectively to said first or second friction engaging device, a source of operating fluid under pressure, a manual selector valve operative in a neutral position to connect each operating chamber to the cooling means for the same friction engaging device and operative on movement from neutral through a range of intermediate, first or second positions to connect said source respectively to said first or second chamber and first or second cooling means and to gradually cut off flow to said first or second cooling means and increase flow to said first or second chamber to a first or second position cutting off flow from said source to said first or second cooling means, and restricted passage means connecting the operating chamber of each friction engaging device to the cooling means for the same friction engaging device to augment the cooling fluid supply during engagement.

17. In a transmission, a first and a second fluid operated friction engaging device each having a chamber operative on the supply of fluid under pressure to said first or second chamber to engage a first or second drive, first and second cooling means to supply cooling fluid respectively to said first or second friction engaging device, a source of operating fluid under pressure, a manual selector valve operative in a neutral position to connect each operating chamber to the cooling means for the same friction engaging device and operative on movement from neutral through a range of intermediate, first or second positions to connect said source respective to said first or second chamber and first or second cooling means and to gradually cut off flow to said first or second cooling means and increase flow to said first or second chamber to a first or second position cutting off flow from said source to said first or second cooling means, and a restricted passage connecting said first and second cooling means to supply a small portion of the fluid supplied to one cooling means to the other cooling means.

18. In a transmission, a first and a second fluid operated friction engaging device each having a chamber operative on the supply of fluid under pressure to said first or second chamber to engage a first or second drive, first and second cooling means to supply cooling fluid respectively to said first or second friction engaging device, a source of operating fluid under pressure, a manual selector valve operative in a neutral position to connect each operating chamber to the cooling means for the same friction engaging device and operative on movement from neutral through a range of intermediate, first or second positions to connect said source respectively to said first or second chamber and first or second cooling means and to gradually cut off flow to said first or second cooling means and increase flow to said first or second chamber to a first or second position cutting off flow from said source to said first or second cooling means, a restricted passage connecting said first and second cooling means to supply a small portion of the fluid supplied to one cooling means to the other cooling means, and a regulator valve connected to each operating chamber operative on the supply of fluid to engage a friction engaging device to vent fluid to the cooling means of the friction engaging device being engaged to augment the supply of cooling fluid during the transition from disengagement to engagement.

19. In a transmission, a first and a second fluid operated friction engaging device each having a chamber operative on the supply of fluid under pressure to said first or second chamber to engage a first or second drive, first and second cooling means to supply cooling fluid respectively to said first and second friction engaging device, a source of operating fluid under pressure, a manual selector valve operative in a neutral position to connect each operating chamber to the cooling means for the same friction engaging device and operative on movement from neutral through a range of intermediate, first or second positions to connect said source respectively to said first or second chamber and first or second cooling means and to gradually cut off flow to said first or second cooling means and increase flow to said first or second chamber to a first or second position cutting off flow from said source to said first or second cooling means, a restricted passage connecting said first and second cooling means to supply a small portion of the fluid supplied to one cooling means to the other cooling means, a regulator valve connected to each operating chamber operative on the supply of fluid to engage a friction engaging device to vent fluid to the cooling means of the friction engaging device being engaged to augment the supply of cooling fluid during the transition from disengagement to engagement, and restricted passage means connecting the operating chamber of each friction engaging device to the cooling means for the same friction engaging device to augment the cooling fluid supply during engagement.

20. In a transmission, a fluid actuated drive control device, a source of fluid under pressure, a control valve including a body having a bore with a closed end having a restricted vent and a valve element closing said bore, said valve element having a transverse passage mounted for reciprocal movement in said bore from a neutral position connecting said fluid actuated drive control device through said transverse passage to exhaust and a drive position connecting said source through said transverse passage to said fluid actuated drive control device, said control valve having feel means including a longitudinal passage extending from said transverse passage to the surface of said valve element adjacent the end, said valve body having a port connecting said longitudinal passage to the end of said bore beyond said valve element when the valve element is in a plurality of intermediate positions to provide feel proportional to the pressure in said fluid actuated drive control device and disconnecting said longitudinal passage from the end of said bore in a range of terminal positions to discontinue said feel and to provide resistance to further movement only with continued movement.

21. In a transmission, a fluid actuated friction engaging device, a source of fluid under pressure, a control valve including a body having a bore with a closed end having a restricted vent and a valve element closing said bore, said valve element having a transverse passage mounted for reciprocal movement in said bore from a neutral position connecting said fluid actuated friction engaging device through said transverse passage to exhaust and a drive position connecting said source through said transverse passage to said fluid actuated friction engaging device, said control valve having feel means including a longitudinal passage extending from said transverse passage to the surface of said valve element adjacent the end, said valve body having a port connecting said longitudinal passage to the end of said bore beyond said valve element when the valve element is in a plurality of intermediate positions to provide feel proportional to the pressure in said fluid actuated friction engaging device and disconnecting said longitudinal passage from the end of said bore in a range of terminal positions to provide a feel resistance proportional to the rate of movement of the valve element and having zero feel at zero movement.

22. In a transmission, a forward and reverse gear unit having fluid operated friction engaging devices providing forward and reverse drive, a multiratio gear unit connected in series with said forward and reverse gear unit having a first and a second fluid operated friction engaging device providing a first and a second drive in either forward or reverse, a source of fluid under pressure, forward and reverse control valve means operative in a forward and a reverse position to connect said source to said forward or reverse fluid operated friction drive devices to establish said forward or reverse drive, ratio control valve means operative in a first and second position respectively to connect said source to said first or said second fluid operated friction drive engaging device to establish said first or second drive, regulator valve means connected to said forward or reverse fluid operated friction engaging devices to regulate the pressure on initial pressure supply to a low value and to raise the pressure gradually to a high value, and said ratio control valve means having means responsive to one position of said ratio control valve means to control said regulator valve to change the pressure value of said low value.

23. In a power plant, an engine having a fuel feed means, governor means having a speed setting device controlling said fuel feed means to provide constant speed engine operation at the speed indicated by said speed setting device and stop means normally holding said speed setting device in a lower speed position and releasable by fluid pressure, the transmission having a forward and a reverse fluid operated drive control means connecting said engine to a load, source of fluid under pressure, a shift valve operative on movement from neutral position in which both fluid operated friction drive means are connected to exhaust and operative in a forward or reverse position to connect said source respectively to said forward or reverse fluid operated drive control means to engage forward or reverse drive and to exhaust the other fluid operated drive control means, knockdown valve means including a valve element located in a closed knockdown bore, biasing means normally biasing said knockdown valve from either end position to a central position, supply means including a restriction connecting said source to said knockdown valve bore, delivery means connecting said knockdown valve bore to said stop means, said knockdown valve means connecting said supply means and delivery means when said knockdown valve element is in said central position and connecting said supply and delivery means to said knockdown bore when said knockdown valve element is in either end position, means connecting said forward and reverse fluid operated drive control means respectively through an orifice connection to the ends of said knockdown valve bore and through an unrestricted passage to said bore at the end of said knockdown valve element adjacent the respective orifice connection when in said central position.

24. The invention defined in claim 23 and said biasing means consisting of a pair of springs abutting opposite ends of said valve bore and engaging said valve element.

25. The invention defined in claim 23 and said biasing means consisting of a spring mounted within a collapsible cage affixed to each side of said knockdown valve element and said cages prestressing said springs to space said spring cages from the ends of said bore when the valve element is in the central position.

26. In a transmission for an engine having a fuel feed control; an input member; an output member; drive means connecting said input and output members having first, second, third and fourth friction engaging means connected to provide drives on the engagement of either one of said first and second engaging means and either one of said third and fourth engaging means and each having fluid actuated operating means actuated on the supply of fluid to engage a drive; said first and second friction engaging means each having cooling means to supply cooling fluid to said first and second friction engaging means; a first and a second source of fluid under pressure; governor means responsive to the speed of said input member controllably connected to said fuel feed control to provide constant input member speed; shift control means including a first shift valve operatively connecting said first source to said first operating means in a first position to engage said first engaging means, to said second operating means in a second position to engage said second engaging means and connecting said first and second operating means to exhaust in neutral position to disconnect the drive and operatively controlling the connection of said second source to said cooling means to provide in said first position a large flow to said first cooling means and a small flow to said second cooling means, in said second position a small flow to said first cooling means and a large flow to said second cooling means and in said neutral position equal flow to both cooling means, and a second shift valve connecting said first source selectively to said third and fourth fluid actuated means to engage said third or fourth engaging means; means responsive to movement of said first shift valve between said first and second positions to place said fuel feed control in a low fuel feed position and inoperative in response to movement from neutral to either first or second positions to change the position of said fuel feed control; regulator valve means to control the pressure supplied to said first and second operating means to provide an initially low and gradually increasing engaging pressure during drive engagement, and to connect the excess fluid during pressure reduction to the cooling means of the friction engaging means being engaged; and means responsive to the operation of said second shift valve to engage one ratio to change the initial low engaging pressure provided by said regulator valve means.

27. In a transmission for an engine having a fuel feed control; an input member; an output member, drive means connecting said input and output members having first, second, third and fourth friction engaging means connected to provide a drive on the engagement of either one of said first and second engaging means and either one of said third and fourth engaging means and each having fluid actuated operating means to engage a drive; said first and second friction engaging means each having cooling means to supply cooling fluid to said first and second friction engaging means; a first and a second source of fluid under pressure; governor means responsive to the speed of said input member controllably connected to said fuel feed control to provide constant input member speed; shift control means including a first shift valve operatively controlling the connection of said first source to said operating means to provide in a first position said first drive, in a second position said second drive and in neutral position to disconnect the drive and operatively controlling the connection of said second source to said cooling means in said first position to provide a large flow to said first cooling means and a small flow to said second cooling means, in said second position a small flow to said first cooling means and a large flow to said second cooling means and in said neutral position to provide equal flow to both cooling means, and a second shift valve controlling the connection of said first source to said third or fourth fluid actuated means; means responsive to movement of said first shift valve between said first and second positions to place said fuel feed control in a low fuel feed position and inoperative in response to movement from neutral to either first or second positions to change the position of said fuel feed control; regulator valve means to control the pressure supplied to said first and second operating means to provide an initially low and gradually increasing engaging force during drive engagement, and to connect the excess fluid during pressure reduction to the cooling means of the friction engaging drive device being engaged; and means responsive to the operation of said second shift valve to engage one ratio to change the initial low engaging force provided by said regulator valve means.

28. In a transmission for an engine having a fuel feed control; an input member; an output member; drive means connecting said input and output members having first, second, third and fourth friction engaging means connected to provide drives on the engagement of either one of said first and second engaging means and either one of said third and fourth engaging means, each of said engaging means having fluid actuated operating means actuated on the supply of fluid to engage a drive; said first and second friction engaging means each having cooling means to supply cooling fluid to said first and second friction engaging means; a source of fluid under pressure; governor means responsive to the speed of said input member controllably connected to said fuel feed control to provide constant input member speed; shift control means including a first shift valve operatively connecting said source to said first operating means in a first position to engage said first engaging means, to said second operating means in a second position to engage said second engaging means and connecting said first and second operating means to exhaust in neutral position to disconnect the drives, and a second shift valve connecting asid source selectively to said third and fourth fluid actuated means to engage said third or fourth engaging means; means responsive to movement of said first shift valve between said first and second positions to place said fuel feed control in a low fuel feed position and inoperative in response to movement from neutral to either first or second positions to change the position of said fuel feed control; regulator valve means to control the pressure supplied to said first and second operating means to provide an initially low and gradually increasing engaging pressure during drive engagement, and to connect the excess fluid during pressure reduction to the cooling means of the friction engaging device being engaged; and means responsive to the operation of said second shift valve to engage one ratio to change the initial low engaging pressure provided by said regulator valve means.

29. In a transmission; an input member; an output member; drive means connecting said input and output members having first, second, third and fourth friction engaging means connected to provide drives on the engagement of either one of said first and second drive means and either one of said third and fourth drive means, each of said friction engaging means having fluid actuated operating means actuated on the supply of fluid to engage a drive; said first and second friction engaging means each having cooling means to supply cooling fluid to said first and second friction engaging means; a first and a second source of fluid under pressure; shift control means including a first shift valve operatively connecting said first source to said first operating means in a first position to engage said first engaging means, to said second operating means in a second position to engage said second engaging means and connecting said first and second operating means to exhaust in neutral position to disconnect the drive and operatively controlling the connection of said second source to said cooling means to provide in said first position a large flow to said first cooling means and a small flow to said second cooling means, in said second position a small flow to said first cooling means and a large flow to said second cooling means and in said neutral position equal flow to both cooling means, and a second shift valve connecting said first source to said third or fourth fluid actuated means; regulator valve means to control the pressure supplied to said first and second operating means to provide an initially low and gradually increasing engaging pressure during drive engagement, and to connect the excess fluid during pressure reduction to the cooling means of the friction engaging means being engaged; and means responsive to the operation of said second shift valve to engage one ratio to change the initial low engaging pressure provided by said regulator valve means.

30. In a transmission for an engine having a fuel feed control; an input member; an output member; drive means connecting said input and output members having first and second friction engaging means, each of said engaging means having fluid operating means and cooling means providing a first and a second drive; a first and second source of fluid under pressure; governor means responsive to the speed of said input member controllably connected to said fuel feed control to provide constant input member speed; shift control means including a shift valve operatively controlling the connection of said first source to said operating means to in first, second and neutral positions respectively provide first drive, second drive and neutral and operatively controlling the connection of said second source to said cooling means to provide in said first position a large flow to said first cooling means and a small flow to said second cooling means, in said second position a small flow to said first cooling means and a large flow to said second cooling means and in said neutral position equal flow to both cooling means; means responsive to movement of said shift valve between said first and second positions to place said fuel feed control in a low fuel feed position and inoperative in response to movement from neutral to either first or second positions to change the position of said fuel feed control; and regulator valve means to control the pressure supplied to said operating means to provide an initial and gradually increasing engaging force during drive engagement, and to connect the excess fluid during pressure reduction to the cooling means of the friction engaging means being engaged.

31. In a transmission for an engine having a fuel feed control; an input member; an output member; drive means connecting said input and output members having first and second friction engaging means, each having fluid operating means and cooling means providing a first and a second drive; a first and second source of fluid under pressure; governor means responsive to the speed of said input member controllably connected to said fuel feed control to provide constant input member speed; shift control means including a shift valve operatively controlling the connection of said first source to said operating means to in first, second and neutral positions respectively provide first drive, second drive and neutral and operatively controlling the connection of said second source to said cooling means to provide in said first position a large flow to said first cooling means and a small flow to said second cooling means, in said second position a small flow to said first cooling means and a large flow to said second cooling means and in said neutral position equal flow to both cooling means; and means responsive to movement of said shift valve between said first and second positions to place said fuel feed control in a low fuel feed position and inoperative in response to movement from neutral to either first or second positions to change the position of said fuel feed control.

32. In a transmission, engine control means for an engine operative in normal position to permit engine operation at normal speeds and operative on movement to knockdown position to reduce the engine speed, a transmission having a first and a second drive control means for providing a first and second drive, shift control means connected to said first and second drive control means operative on movement from a neutral position to a first or a second position for operating said first or second drive control means to engage first or second drive, knockdown control means operatively connected to said engine control means and operative in neutral position and during a shift of said shift control means from neutral to first or second positions for permitting normal operation of said engine control means and operative during a shift of said shift control means from first to second or from second to first positions for momentarily moving said engine control means to said knockdown position during the shift interval and thereafter permitting return of said engine control means to said normal position.

33. The invention defined in claim 32, and first drive being a forward drive, said second drive being a reverse drive, and said shift control means being moved sequentially from said first position to neutral and then to said second position and from said second position to neutral and then to said first position.

34. In a transmission, fuel feed means for an engine having a plurality of settings for controlling fuel feed, a transmission having a first and a second drive control means for providing a first and second drive, shift control means connected to said first and second drive control means operative on movement from a neutral position to a first or a second position for operating said first or second drive control means to engage first or second drive, knockdown control means operatively connected to said fuel feed means and operative in neutral position and during a shift of said shift control means from neutral to first or second positions for permitting normal operations of said fuel feed means and operative during a shift of said shift control means from first to second or from second to first positions for momentarily reducing said fuel feed setting from the existing setting to a lower setting during the shift interval and thereafter permitting return of said fuel feed means to said existing setting.

35. In a transmission, a fluid actuated drive control device, a source of fluid under pressure, a control valve including a body having a bore with a closed end having a restricted vent and a valve element closing said bore, said valve element being mounted for reciprocal movement in said bore from a neutral position connecting said fluid actuated drive control device to exhaust and a drive position connecting said source to said fluid actuated drive control device, said control valve having feel means including passage means connecting said fluid actuated drive control device to the end of said bore beyond said valve element when the valve element is in a first range of positions to provide feel proportional to the pressure in said fluid actuated drive control device in said first range of positions and disconnecting said passage from said fluid actuated friction drive control device to the end of said bore in a second range of positions to discontinue said feel in said second range of positions.

36. In a transmission, fuel feed means for an engine having a plurality of settings for controlling fuel feed, a transmission having a first and a second drive control means for providing a first and second drive, shift control means connected to said first and second drive control means operative on movement from a neutral position to a first or a second position for operating said first or second drive control means to engage first or second drive, knockdown control means operatively connected to said fuel feed means and operative in neutral position and during a shift of said shift control means from neutral to one of said first and second positions for permitting normal operations of said fuel feed means and operative during a shift of said shift control means from one to another of said first and second positions for momentarily reducing said fuel feed setting from the existing setting to a lower setting during the shift interval and thereafter permitting return of said fuel feed means to said existing setting.

37. In a transmission; a plurality of fluid operated friction engaging devices selectively engaged to provide a first and second drive; a source of fluid under pressure regulated at a normal value; control valve means operative in a first condition to connect said source to at least one of said fluid operated friction engaging devices to establish a first drive and operative in a second condition to connect said source to at least another of said fluid operated friction engaging devices to establish said second drive; regulator valve means connected to at least one of said fluid operated friction engaging devices sequentially operative in response to the initial supply of fluid to said last mentioned fluid operated friction engaging device to first regulate the pressure on the initial pressure supply at a low regulated value, less than said normal value and insufficient for non-slip engagement, and then operative to raise the regulated pressure gradually to said normal value for non-slip engagement; and said control valve means having means connected to said regulator valve means and operative in response to one condition of said control valve means to control said regulator valve means to change the pressure value of said low regulated value.

38. The invention defined in claim 37 and said regulator valve having biasing means operative in response to the initial supply of fluid to said fluid operated friction engaging device to first regulate the pressure at said low value and said means connected to said regulator valve means being connected to said biasing means of said control valve means.

39. In a transmission; a plurality of fluid operated friction engaging devices selectively operative to provide a first and a second drive; a source of fluid under pressure regulated at a normal value; control valve means operative in a first condition to connect said source to at least one of said fluid operated friction engaging devices to establish said first drive and operative in a second condition to connect said source to at least another of said fluid operated friction engaging devices to establish said second drive; regulator valve means connected to said fluid operated friction engaging devices including a valve element and biasing means biasing said valve element operative to regulate the pressure of the fluid supplied to said fluid operated friction engaging device, biasing control means operably connected to said biasing means operative sequentially in response to the initial supply of fluid under pressure to said one and another fluid operated friction engaging devices, to first operate in a normal position to control the biasing means to regulate the pressure on initial pressure supply to a low value, less than said normal value and insufficient to fully engage said friction engaging devices and then operative to control the biasing means to regulate the pressure at an automatically controlled rate to raise the pressure gradually to a high value for full engagement and then to said normal value; and said control valve having means responsive to one condition of said control valve means to change the initial position of said biasing control means to control said regulator valve to change the pressure value of said low value to another low value to be supplied initially to said friction engaging devices.

References Cited in the file of this patent

UNITED STATES PATENTS

| | | |
|---|---|---|
| 1,883,908 | Maybach | Dec. 1, 1931 |
| 2,118,978 | Maybach | May 31, 1938 |
| 2,732,732 | Borman | Jan. 31, 1956 |
| 2,766,639 | Rosenberger | Oct. 16, 1956 |
| 2,786,454 | Bertsch | Mar. 26, 1957 |
| 2,815,737 | Gold | Dec. 10, 1957 |
| 2,833,308 | Berry | May 6, 1958 |
| 2,833,385 | Peterson | May 6, 1958 |
| 2,837,181 | Kelley | June 3, 1958 |
| 2,870,789 | Bilaisis | Jan. 27, 1959 |
| 2,873,826 | Werner | Feb. 17, 1959 |
| 2,893,261 | Flinn | July 7, 1959 |
| 2,919,603 | Livermore | Jan. 5, 1960 |
| 2,925,156 | Grant et al. | Feb. 16, 1960 |
| 2,940,556 | Jensen | June 14, 1960 |
| 3,004,446 | Flinn | Oct. 17, 1961 |
| 3,008,349 | Winchell et al. | Nov. 14, 1961 |
| 3,025,717 | Christenson | Mar. 20, 1962 |
| 3,025,718 | Christenson | Mar. 20, 1962 |
| 3,033,333 | Breting et al. | May 8, 1962 |
| 3,039,327 | Breting | June 19, 1962 |